Patented Jan. 10, 1939

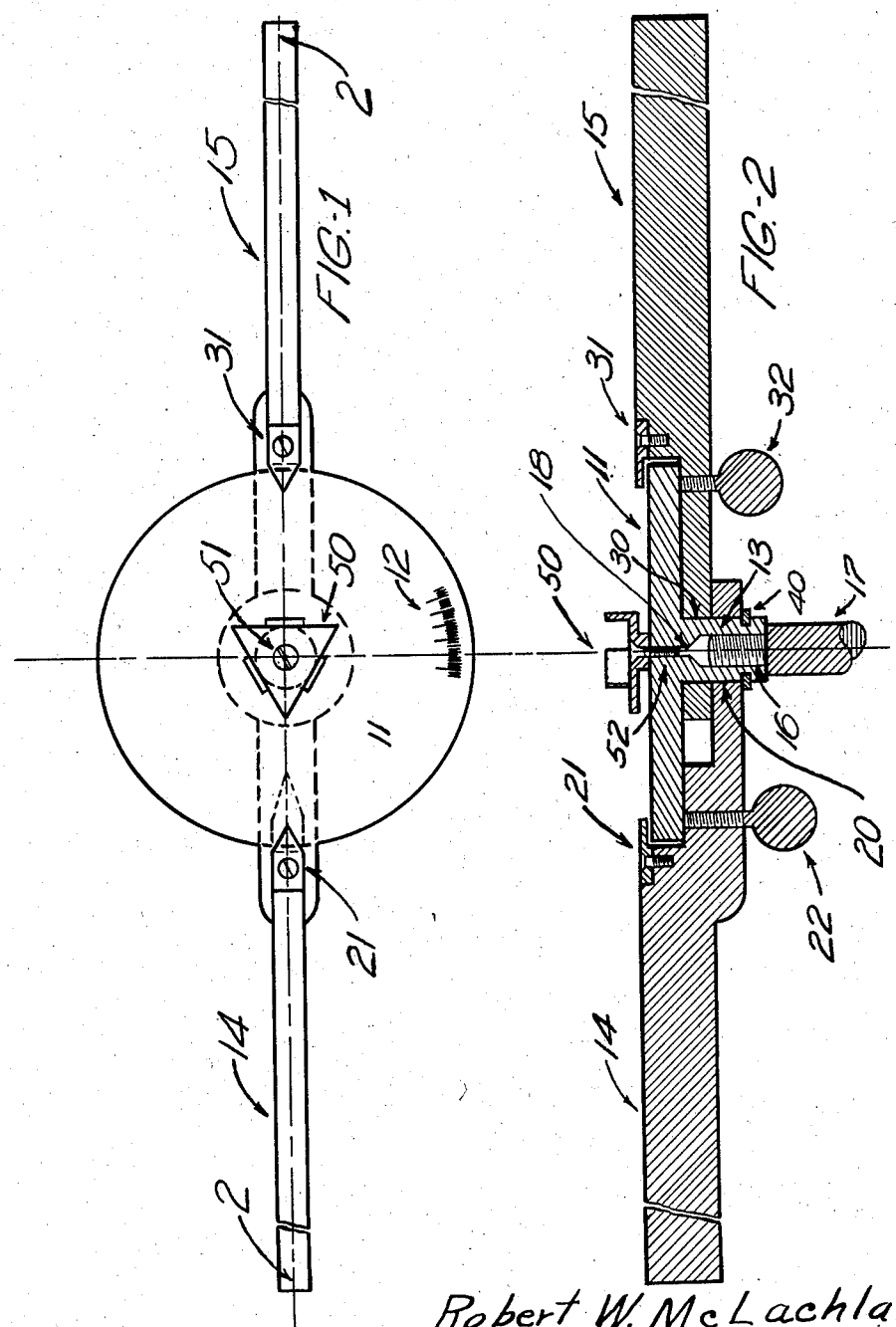

2,143,160

UNITED STATES PATENT OFFICE 2,143,160

SPECTROMETER

Robert W. McLachlan, Upper Montclair, and Charles E. Slingland, Totowa, N. J.

Application October 6, 1937, Serial No. 167,504

6 Claims. (Cl. 35—19)

Our invention relates to spectrometers, spectroscopes and spectographs and more particularly to an instrument upon which the different elements of the spectroscope, spectrometer, spectrograph and/or collimator may be readily assembled for use in effectively teaching the mechanical principles employed therein to students in schools and colleges, and has for its object the production of an instrument upon which the student may assemble the elemental parts of a spectroscope in the open and without obstruction so that he may not only form and analyze the spectra of the rays emitted by a body or substances but be able to observe and study the nature and operation and relationship of the elemental parts of the spectroscope.

A further object is to produce an instrument that may be used to instruct pupils in the elements of the spectroscope as above disclosed but also to teach the operation of the different elements while measuring the deviation of ray of light produced by a prism.

A further object is the production of a simple spectrometer serving the dual purpose of demonstrating the principles of construction of spectrometers as well as for use in performing student laboratory experiments.

The foregoing and other features of our invention will now be described in connection with the accompanying drawing forming part of this specification in which we have represented our instrument in a preferred form after which we shall point out in the claims those features which we believe to be new and of our own invention.

In the drawing:

Figure 1 is a top view of the instrument.

Figure 2 is a vertical section along the line 2—2, Figure 1.

In the carrying out of our invention we employ a circular table 11 provided on its top face with a graduated circumference 12 and upon its bottom face an extension 13 to serve as a bearing for the arms 14 and 15 adapted to rotate upon the extension 13.

The extension 13 is screw threaded as at 16 adapted to receive a central standard 17 of a tripod or other supporting base, not shown.

The top face of the table in the center thereof has a screw threaded hole 18. This hole 18, the bearing extension 13 and the screw threaded hole 16 must all be concentric with the center of the table 11.

The arm 14 is of rectangular cross section and on one end is a bearing 20 adapted to operate upon the extension 13. A pointer 21 is secured to the top face of the arm and extends over the top face of the table 11 and follows the graduations 12 as the arm 14 swings around the circle upon its support. A set screw 22 is mounted in the arm to lock the arm in its adjusted position around the circle.

The arm 15 is also of rectangular cross section and is similarly equipped with bearing 30, pointer 31, set screw 32.

To hold these arms in their relative position we use a spring collar 40.

As a means for mounting a prism when the instrument is used as a spectrometer we provide a spring clip 50 which as shown is screw fastened to the table 11 by the screw 51, the thread 52 of the screw entering the screw threaded hole 18 previously described as on the central axis of the instrument.

We are aware that spectrometers have been made with rotatable supporting members and with a graduated disc and we do not make claim therefore to such a combination broadly, but we do not know of an instrument that has the novel combination of elements as set forth adapted for use with supporting arms of dimensions such that standard lens holders, screen supports, and other optical parts can be mounted and adjusted to form a model collimator and a model telescope.

We wish it distinctly understood that our instrument herein described and illustrated is in the form in which we desire to construct it and that changes or variations may be made as convenient or desirable without departing from the salient features of our invention and we therefore intend the following claims to cover such modifications as naturally fall within the lines of invention.

We claim:

1. In a laboratory instrument, in combination, a central support carrying a table provided with a graduated circle on its top face and a hub upon its lower face, two arms each provided with bearings to move on the hub, said arms carrying pointers on their top face adapted to travel on the graduated circle when the arms are rotated about the hub.

2. The device of claim 1 with means to lock the arms to the table in any adjusted angular relationship.

3. The device of claim 1 with the addition that each arm is provided with means to lock it to the table.

4. The device of claim 1 with the addition of means to mount a prism on the central axis above the graduated circle.

5. In a laboratory instrument in combination, a central support provided with a vertical hub and a horizontal circle of graduations, two arms each adapted to engage the hub and swing around the support carrying pointers that travel over the graduated scale.

6. The device of claim 5 with the addition that the arms are of rectangular cross section and adapted to receive and hold supporting arms of standard lens holders and/or other optical parts.

ROBERT W. McLACHLAN.
CHARLES E. SLINGLAND.